United States Patent

Holton

[15] 3,704,739
[45] Dec. 5, 1972

[54] FASTENING DEVICE

[72] Inventor: Robert J. Holton, Rocky River, Ohio

[73] Assignee: Eaton Corporation, Cleveland, Ohio

[22] Filed: Nov. 30, 1970

[21] Appl. No.: 93,602

[52] U.S. Cl. .............................................151/41.7
[51] Int. Cl. ...........................................F16b 39/00
[58] Field of Search....151/41.74, 41.75, 41.7, 41.76; 85/32 K

[56] References Cited

UNITED STATES PATENTS

| | | | |
|---|---|---|---|
| 1,581,416 | 4/1926 | Alpaugh | 85/32 K |
| 2,278,790 | 4/1942 | Langmail | 151/41.75 |
| 2,558,720 | 7/1951 | Hansman | 151/41.75 |

Primary Examiner—Edward C. Allen
Attorney—Teare, Teare & Sammon

[57] ABSTRACT

A fastening device for use with an apertured panel including a body having a base adapted for engagement with one side of a support panel and an attachment member adapted for engagement with the opposite side of the panel. The attachment member is connected to the base at one end and free adjacent the other end and laterally spaced from the base to receive the marginal edge of the panel therebetween. A tubular hub extends inwardly from the base being adapted to be inserted into the aperture in the panel. The hub includes a bore adapted to receive a threaded member therein for locking the hub within the aperture to secure the device on the panel.

5 Claims, 7 Drawing Figures

INVENTOR
ROBERT J. HOLTON
BY
Teare, Teare & Sammon
ATTORNEYS

3,704,739

1
FASTENING DEVICE

BACKGROUND OF THE INVENTION

The present invention relates to fastening devices for use in assembly with a threaded member, such as a stud, screw, bolt or the like, for securement of various component parts, such as thermo-plastic panels or the like to other plastic or steel panels.

Heretofore, numerous problems have been encountered when attempting to attach a panel of relatively deformable material, such as thermo-plastic or the like, to other panels made of similar material or relatively harder material, such as steel or the like, by means of a plain threaded member. More specifically, these attachments often resulted in the crushing and/or weakening of the thermo-plastic material surrounding the aperture in the panel. It has been found extremely desirable to provide a fastening device which can prevent such crushing and weakening and which also protects the confronting portion of the aperture in the thermo-plastic panel to prevent contact with the threaded member, and thus, eliminate any tendency to tear or deform the material in a manner which would further tend to weaken the area under the fastener.

SUMMARY OF THE INVENTION

The present invention contemplates providing a fastening device which is adapted for use in attaching a thermo-plastic panel to another plastic or steel panel. The device comprises a body including a base adapted for engagement with one side of the panel and an attachment means adapted for engagement with the opposite side of the panel. A tubular hub extends from the base being adapted to be inserted in the aperture in a support panel, and the hub clampingly coacts with the attachment means for securing the device on the panel. The attachment means includes a deformable arm which is laterally spaced from the base for receiving the marginal edge of the panel therebetween. The hub includes a bore adapted for engagement with a threaded member to lock the hub in the aperture in the installed position of the device. In addition, the arm is connected at one end to the base being free adjacent the other end for pivotal movement about the connected end toward and away from the base. The hub is formed integral with the base being open at its end remote therefrom for receiving the threaded member therein. Further, a pilot means is provided on the hub for guiding the threaded member into the bore. The pilot means comprises helical threads formed from the material of the hub for engaging the first thread on a threaded member. The arm extends initially in generally angular relation with respect to the general plane of the base being adapted to close upon the base for locking the hub within the aperture in the panel in the installed position of the device.

As can be seen, by positioning the tubular hub within the aperture in the panel, crushing and weakening of the area surrounding the aperture is prevented. In addition, the tubular hub prevents contact of the threads of the threaded member with the material surrounding the aperture and, therefore, reduces the tendency of the material to tear and/or be deformed in a manner to further weaken the area under the fastener.

2
BRIEF DESCRIPTION OF THE DRAWINGS

DESCRIPTION OF THE PREFERRED EMBODIMENTS

Figure 1:
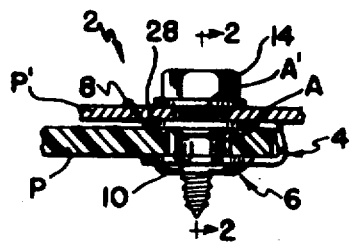
FIG. 1 is a fragmentary, partially in section, side elevation view of the fastening device made in accordance with the present invention in the applied position with a threaded member for adjoining two apertured support panels in superposed relationship.
Figure 2:
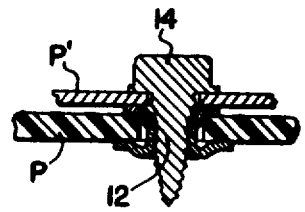
FIG. 2 is a fragmentary, vertical section view of the device taken along the plane of line 2—2 of FIG. 1.

There is illustrated in FIG. 1, generally at 2, one form of the fastening device of the present invention which may be made from a piece or strip of metallic material, such as cold-rolled steel or the like. In the form shown, the device 2 comprises a clip-like body 4 including a base 6 adapted for mounting adjacent one side of a support panel P and an attachment means 8 adapted to be mounted adjacent the opposite side of the panel P. A tubular hub 10 extends from the base 6 in the direction toward the attachment means 8 being adapted to be disposed within an aperture A in the panel P. The hub 10 clampingly coacts with the attachment means 8 for securing the device 2 to the panel P in a semi-installed position thereof. Referring now to FIG. 2, the hub 10 is provided with an axially extending bore 12 adapted to receive a stud member 14, such as a screw or the like, in threaded relation therein for attaching a panel P' to the panel P in the finally installed position of the device.

Figure 3:
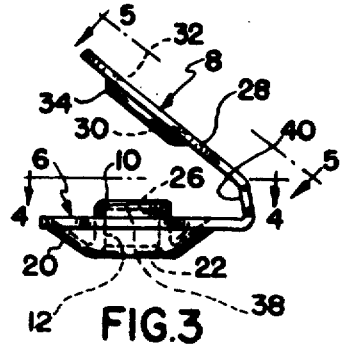
FIG. 3 is a side elevation view of the fastening device shown in FIG. 1.
Figure 4:
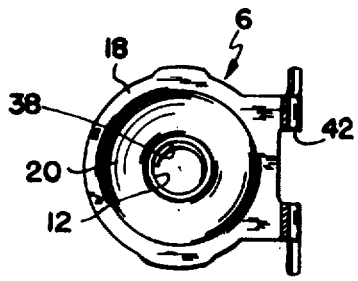
FIG. 4 is a top plan view showing the resilient arm construction of the fastening device of FIG. 3, but with the lower portions of the device removed for purposes of clarity.

Referring now to FIG. 4, the base 6 includes an enlarged section 18 which may have a generally circular shape in top plan. The enlarged section 18, in the form shown, is pressed downwardly (FIG. 3) providing a dish-shaped web portion 20 having a generally frusto-conical configuration when viewed in side elevation. The web portion includes an opening, as at 22, which is located generally centrally of the enlarged section 18.

As shown, the tubular hub 10 is integrally joined to the web portion 20 adjacent the marginal edge of the opening 22 and includes the axially extending bore 12 which is axially aligned with the opening 22 and in communication therewith. The hub 10 extends generally upwardly from the web portion 20 in a direction toward the attachment means 8 and includes an opening 26 therein adjacent the end remote from the connected end being adapted to receive the stud member 14 therethrough.

Figure 5:
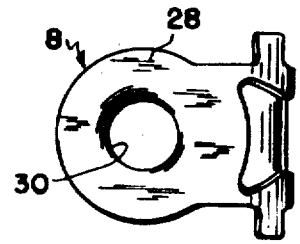
FIG. 5 is a bottom plan view of the fastening device shown in FIG. 3 with the upper portions of the device removed for purposes of clarity.

Referring again to FIG. 3, the attachment means 8 comprises a deformable arm 28 which is connected at one end to the base 6 and is free adjacent its opposite end for movement toward the base upon installation of the device. As shown in FIG. 5, the arm 28 may include an enlarged circular portion adjacent the free end thereof having a generally centrally located opening 30 therein adapted to receive the stud member 14 therethrough. The opening 30 may be of any suitable configuration, and is shown as being generally circular when viewed in top plan (FIG. 5). As best seen in FIG. 3, the arm 28 is provided with a depressed portion which is struck downwardly, as at 32, to provide an angular projection 34 which is flared generally downwardly in a direction toward the base 6 to provide a dished-in surface to aid the stud member 14 in entering the opening 30, and thus, the tubular hub 10.

Referring now to FIGS. 3 and 4, the hub 10 is provided with generally helically shaped threads 38 formed out of the material of the hub adjacent the marginal edge of the opening 26 being adapted to engage the first thread of the stud member 14, and thus, guide the stud member 14 into the bore 12. In the form shown, the bore 12 is provided without threads being adapted to have threads cut therein upon threaded insertion of the stud member 14 therein, but it is to be understood that the bore 12 may be initially threaded throughout its length. It is to be further understood, that it is not absolutely necessary to provide the helical thread 38, however, the addition of the thread 38 preferred in that such considerably reduces the starting torque required to initially insert the stud into the bore 12.

As shown in FIG. 3, the general plane of the arm 28 is disposed in angular relation with respect to the general plane of the enlarged portion 18 enabling the device 2 to be inserted over the marginal edge of the panel P. Preferably, the arm 28 is bent generally vertically, as at 40, and then generally angularly in overlying relation with respect to the base 6. By this arrangement, allowance is made for the thickness of the panel P. Preferably, the vertical portion 40 of the arm 28 is cut out, as at 42, to facilitate bending movement of the arm 28 toward the base 6 into the finally installed position, as shown in FIGS. 1 and 2.

When the panels P and P' are both made of materials relatively softer than metal, such as thermoplastic or the like, the tubular hub 10 may have minimum transverse dimensions greater than the maximum corresponding transverse dimensions of the opening 30 to enable the upper end of the hub 10 to be drawn into engagement with the arm 28 and thus, prevent excessive pressure on the panels which could cause deformation or tearing thereof. Whereas, should the panel P' be made of metal material and the panel P be made of thermoplastic material, then the tubular hub 10 may have maximum transverse dimensions less than the corresponding transverse dimensions of the opening 30 to enable the hub 10 to be drawn up through the opening 30 into engagement with the panel P'. Preferably, the transverse dimensions of the tubular hub 10 are only slightly greater than the corresponding transverse dimensions of the opening 30 so that the hub 10 will be drawn up into engagement with the projection 34. By this latter arrangement, the projection 34 will cammingly coact with the hub 10 to urge the side walls of the bore 12 into tight, resilient gripping engagement with the threads of the stud member 14 in the finally installed position of the device (FIG. 2) to resist loosening of the stud member as a result of vibration or the like.

The height of the tubular hub 10 and the vertical portion 40 may be varied to accommodate panels of different thickness. Preferably, the height of the vertical portion 40 is varied in relation to the height of the tubular hub 10. By this arrangement, the pressure applied to the panels P and P' can be controlled to prevent the application of excessive pressure thereon when inserting the stud member 14.

It is to be understood that the device 2 may be formed so as to have the general plane of the arm 28 extending initially in generally parallel relation to the general plane of the section 18. When used in this form, a panel P'' would be required having a slot 29 therein which would extend to one of its outer edges, as at 31, to enable the hub 10 to be inserted therethrough.

Figure 6:
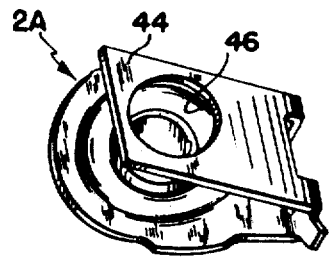
FIG. 6 is a perspective view of another embodiment of the fastening device illustrated in FIGS. 1 to 5.
Figure 7:
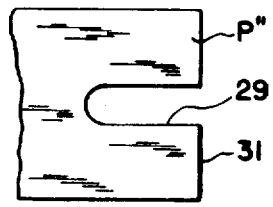
FIG. 7 is a side elevation view of another form of support panel to which the present invention may be applied.

Referring now to FIG. 6, there is illustrated another embodiment of the present invention. In the form shown in FIG. 6, an arm 44 may be provided which is generally polygonal, such as rectangular, when viewed in top plan, having an opening 46 provided adjacent the free end thereof. In this form, the flared projection 34 is omitted adjacent the marginal edge of the opening 46 to enable the arm 44 to be mounted in flush relationship with the confronting side of the panel P regardless of the size of the opening 46 as compared to the size of the aperture A in the panel P.

In a typical application of the clip device 2, the marginal edge of the panel P is inserted in the space between the base 6 and the arm 28. The tubular hub 10 is then aligned and inserted into the aperture A in the panel P. The arm 28 may then be bent downwardly so as to overlap the marginal end of the panel P thereby clampingly coacting with the hub 10 to loosely secure the device 2 to the support panel P. The other panel P' may then be applied in overlying relation with respect to the arm 28 so as to have the aperture A' therein axially aligned with the opening 30, which in turn, is disposed in axial alignment with the bore 12 and the openings 22 and 26 in the semi-installed position of the device. The stud member 14 may then be inserted through the opening 30 so as to be brought into engagement with the helical threads 38 adjacent the upper marginal end of the tubular hub 10. Continued threading of the stud member 14 into the hub 10 will cause threads to be cut in the side wall of the bore 12. Further, as the stud is turned into the bore 12, the web portion 20, being deformable, will be bent upwardly (FIG. 2) causing the hub 10 to be drawn toward the arm 28. When the maximum transverse dimensions of the hub 10 are only slightly greater than the corresponding transverse dimensions of the opening 30 adjacent the marginal edge of the projection 34, the hub 10 will be drawn up into engagement with the projection 34, which in turn, will cammingly engage the hub, thereby deforming the material thereof inwardly into tight gripping engagement with the stud member 14 when the latter is fully driven into the hub 10 in the finally installed position (FIG. 2).

I claim:

1. A sheet metal fastening device for use with an apertured panel comprising a base adapted for engagement with one side of the panel and an attachment means adapted for engagement with the other side of the panel, said base and said attachment means deformably joined at one end and being angularly divergent at their free ends to receive the marginal edge of said panel therebetween, said base including a tubular hub extending from said base toward said attachment means and adapted for insertion through said aperture, said hub including a threaded member receiving bore therethrough, said attachment means including a projection extending towards said base and having an opening therethrough, the outside transverse dimension of said hub being slightly greater than the inside transverse dimension of said opening, said projection clampingly engaging said hub to maintain said fastener in preassembled position in said panel aperture when said free ends are deformably forced together over said panel, said bore registering with said opening in said preassembled position and said projection camingly engaging said hub when forced together by tightening of the threaded member to force said hub inwardly to lockingly engage the threaded member.

2. A fastening device in accordance with claim 1, including pilot means formed on said hub for guiding a threaded member into said bore.

3. A fastening device in accordance with claim 2, wherein
said pilot means comprises helical threads formed from the material of said hub for engaging the first thread on said threaded member.

4. A fastening device in accordance with claim 3, wherein said bore is fully threaded throughout its length.

5. A fastening device in accordance with claim 1, wherein
said base is generally frusto-conical in configuration, in side elevation, having a centrally located opening, and
said hub includes an opening therein which coincides with the opening in said base being adapted to receive a threaded member therein for securing said device to said panel.

* * * * *